United States Patent [19]

Fletcher

[11] Patent Number: 4,598,830
[45] Date of Patent: Jul. 8, 1986

[54] SELF-LEVELLING BOOM ARRANGEMENT FOR AN AGRICULTURAL MATERIAL DISTRIBUTION DEVICE

[75] Inventor: Grant Fletcher, Crossfield, Canada

[73] Assignee: Redi-Go Farm Services (1980)Ltd., Crossfield, Canada

[21] Appl. No.: 703,919

[22] Filed: Feb. 21, 1985

[30] Foreign Application Priority Data

Jan. 21, 1985 [CA] Canada ............................. 472483

[51] Int. Cl.⁴ .............................................. B66C 23/72
[52] U.S. Cl. ................................... 212/195; 212/266; 239/166
[58] Field of Search ............... 212/146, 189, 195, 238, 212/261, 266; 239/159–168, 195, 198, 243, 172

[56] References Cited

U.S. PATENT DOCUMENTS

| | | | |
|---|---|---|---|
| 3,545,678 | 12/1976 | Tangeman | 239/166 |
| 3,887,132 | 6/1975 | Widmer | 239/166 |
| 3,957,203 | 5/1976 | Bullard | 239/165 |
| 4,221,353 | 9/1980 | Kuhn et al. | 239/166 |
| 4,427,154 | 1/1984 | Mercil | 239/167 |
| 4,529,129 | 7/1985 | Ballu | 239/164 |

FOREIGN PATENT DOCUMENTS

| | | | |
|---|---|---|---|
| 2270774 | 12/1975 | France | 239/167 |
| 2342016 | 9/1977 | France | 239/167 |

*Primary Examiner*—Trygve M. Blix
*Assistant Examiner*—Stephen P. Avila
*Attorney, Agent, or Firm*—Stanley G. Ade

[57] ABSTRACT

A self-levelling boom arrangement for supporting upon a frame of an agricultural material distribution device includes a pair of boom arms extending outwardly from a central support beam. The boom arms are pivotally mounted on a single horizontal pin on the beam for raising and lowering in a vertical plane. The beam is pivotally mounted at a lower end so that the pin can move side to side in the vertical plane. Hydraulic rams are connected to the arms at positions spaced outwardly of the central pin for raising and lowering the arms relative to the frame. Thus, the arms can be raised and lowered independently while the central beam provides a self-levelling effect.

11 Claims, 2 Drawing Figures

SELF-LEVELLING BOOM ARRANGEMENT FOR AN AGRICULTURAL MATERIAL DISTRIBUTION DEVICE

BACKGROUND OF THE INVENTION

This invention relates to a self-levelling boom arrangement for supporting upon a frame of an agricultural material distribution device.

Agricultural material distribution devices have been proposed for many years including sprayers and various types of pneumatic spreaders for granular or powdered material. Larger devices of this type tend to have a boom which is supported by wheels at the ends or along the length together with a central support at a material transport truck arrangement. In these cases the height of the boom relative to the ground is controlled to a great extent by the wheels so that provided there is flexibility between the portions of the boom, it tends to maintain a proper height relative to the ground.

Other devices of this type have a centrally supported boom with boom arms which extend outwardly to respective sides of a central frame portion with a plurality of nozzles or jets arranged along the length of the arms for spreading the material in controlled fans along the length of the boom. It will be appreciated that if the boom changes its height relative to the ground, then the fan developed by one nozzle or jet will either overlap with or be spaced from the fan of the next adjacent nozzle, thus altering the amount of material applied to the ground and detracting from the proper distribution of the material.

Changes of height of the boom relative to the ground can occur in two different ways. Firstly, the frame supporting the central truck device and support for the boom can tilt should the frame move over uneven ground whereupon one arm of the boom will move closer to the ground and the other will be lifted away from the ground. In other cases the frame can remain level while the ground on one side of the frame raises or lowers at a ditch or the like.

In view of the above problems concerning proper distribution, it is extremely desirable to be able to control and self-level the boom so that as far as possible the height of the boom remains constant relative to the ground.

It is one object of the present invention, therefore, to provide an improved boom arrangement of this type which is effectively self-levelling.

According to the invention, therefore, there is provided a self-levelling boom arrangement for supporting upon a frame of an agricultural material distribution device comprising a pair of boom arms each arranged to extend outwardly to one side of the frame and including means for spreading said material along the length of the arms, a central support member, pivotal mounting means for mounting each of said arms on said central support member for pivotal movement relative thereto about a substantially horizontal axis at right angles to the length of the arm, two linkage means each pivotally connected to a respective one of said arms at a position spaced from said pivotal mounting means and arranged for pivotal attachment to said frame and means for mounting said central support member on said frame for side to side movement of said pivotal mounting means relative to said frame whereby said boom arms are moved relative to said frame on tilting of said frame relative to the vertical to tend to self-level said arms.

According to a second aspect of the invention, therefore, there is provided a self-levelling boom arrangement for supportng upon a frame of an agricultural material distribution device comprising a pair of boom arms each arranged to extend outwardly to one side of the frame and including means for spreading said material along the length of the arms, a central support member, pivotal mounting means for mounting each of said arms on said central support member for pivotal movement relative thereto about a substantially horizontal axis at right angles to the length of the arm, two linkage means each pivotally connected to a respective one of said arms at a position spaced from said pivotal mounting means and arranged for pivotal attachment to said frame, said linkage means including means for raising and lowering the respective arm independently of the other arm and means for mounting said central support member on said frame for side to side movement of said pivotal mounting means relative to said frame whereby said boom arms can be independently raised and lowered while providing a self-levelling effect to tend to accommodate tilting of the frame relative to the vertical.

It is one advantage of the invention, therefore, that the arms can be raised and lowered independently of one another while retaining the self-levelling effect which tends to accommodate tilting of the same relative to the vertical.

This can be provided by an arrangement in which the central support member comprises a simple vertical beam pivoted at a lower end with the arms pivotally connected to the beam at a single point, thus providing a symmetrical arrangement which is effectively self-levelling by the side to side movement of the beam provided by the pivotal coupling at the bottom of the beam.

The linkages can be in the form of hydraulic rams coupled to the arms outwardly of the central beam and extending upwardly and inwardly therefrom for connection to the frame so that actuation of one of the rams raises or lowers the respective arm independently while the central support beam remains central to accommodate tilting of the frame.

With the foregoing in view and other advantage as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

Figure 1:
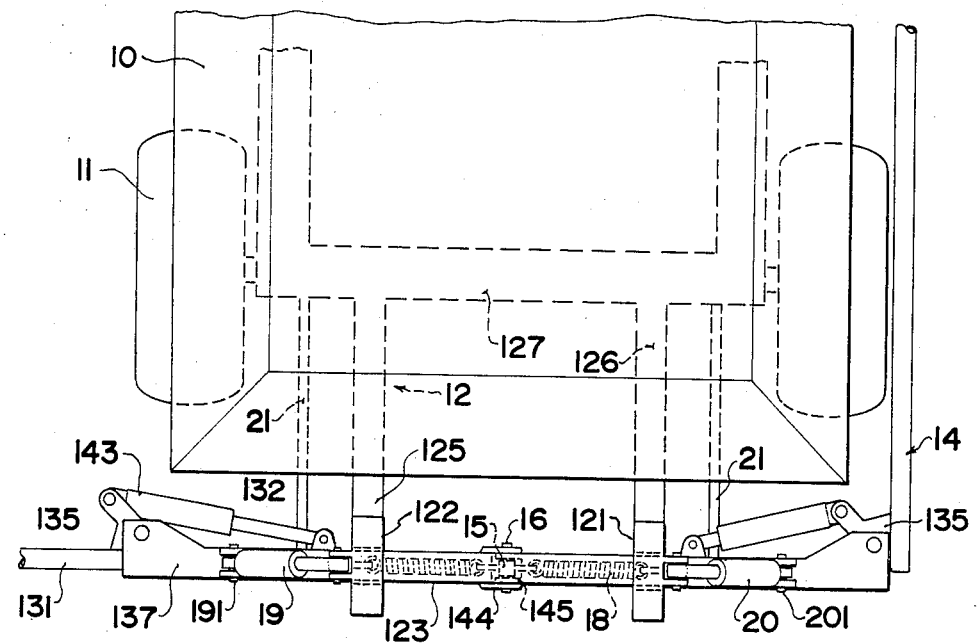
FIG. 1 is a top plan view of a boom arrangement according to the invention, mounted upon a truck and frame assembly.
Figure 2:
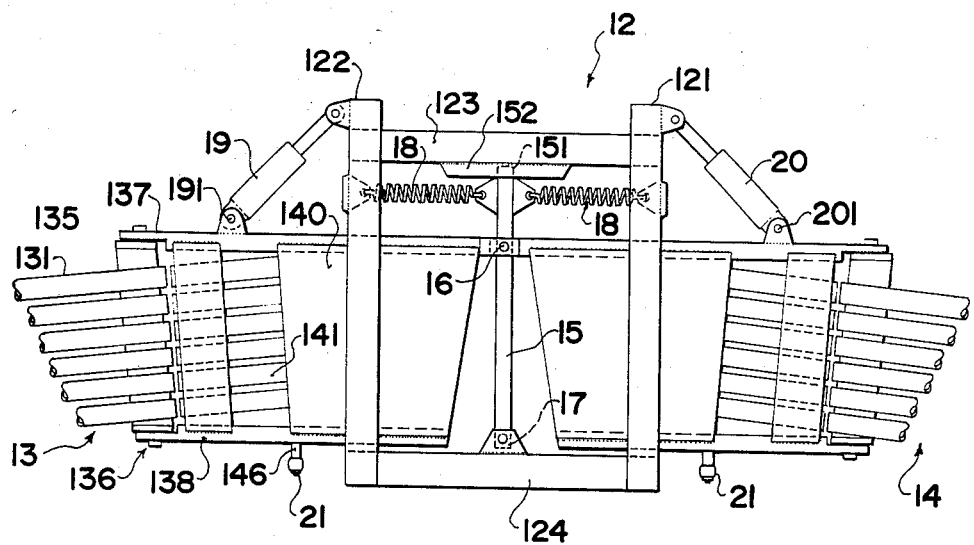
FIG. 2 is a rear elevational view of the arrangement of FIG. 1.

The boom assembly is illustrated in FIGS. 1 and 2 attached to a pneumatic granular distributor which is shown schematically including a tank 10 mounted on ground wheels 11 with a frame structure generally indicated at 12 for supporting the boom rearwardly of the tank 10.

The frame 12 comprises a substantially rectangular frame structure including two uprights 121, 122 and two cross-members 123, 124. The rectangular frame is coupled by forward beams 125 and 126 to a chassis 127 of the truck.

The boom assembly is mounted on the frame 12. The boom assembly comprises a left boom arm 13 and a right boom arm 14 which are symmetrical. Each boom arm comprises a plurality of distribution tubes 131 which are connected together by straps (not shown) arranged along the length thereof adjacent spreader nozzles which are omitted as they are conventional. A supporting frame member 135 mounts an inner end of the tubes or ducts 131 with the member 135 being pivotal as shown in FIG. 1 from an extended position of the boom arm to a retracted position which is shown in the right hand arm.

The frame member 135 is pivotally mounted therefore on an inner arm frame generally indicated at 136 including an upper strut 137 and a parallel lower support strut 138 connected by vertical strut 139 and also by a plenum chamber 140. Thus the inner frame member 136 defines a rigid structure which supports the whole of the outer arm in the form of tubes 131. The inner frame 136 supports tube portions 141 which connect into the plenum chamber 140 at one end and at the other end provide a coupling (shown only schematically) for connection to the duct portions 131 in the extended position of the boom.

Folding of the boom at the support 135 is obtained by a hydraulic ram 143 which is coupled to the member 135 with the ram rod attached to the lower strut 138 by a lug 132.

The inner frame 136 is connected to a central support beam 15 by an extension portion of the strut 137. The coupling is provided by a transverse pin 16 with the portion 137 mounted thereon by spaced flanges so that the portion 137 can pivot in a vertical plane about the horizontal pin 16. It will be appreciated that the left and right hand booms are symmetrical in this regard except that the left hand boom provides flanges 144 which are outwardly of the flanges 145 of the right hand boom.

The support beam 15 is pivotally mounted upon a coupling 17 at the lower end thereof with the coupling 17 attached to the transverse frame member 124. The pin 16 is arranged adjacent the top of the support beam 15 but spaced from the top where there is provided a slide guide 151 provided by a pair of spaced flanges 152 attached to the upper transverse strut 123. Thus the upper end of the central support beam 15 runs between the flanges 152 so as to be maintained in its movement in a vertical plane containing the boom arms 13 and 14. Springs 18 are attached to the sides of the central support beam 15 and couple the beam to respective uprights 121 and 122 so as to provide a damping effect of the side to side movement available in the central support beam 15.

Hydraulic rams 19, 20 are coupled between the struts 137 of the arms 13, 14 respectively and the frame uprights 122, 121 respectively. The hydraulic rams 19, 20 are pivotally coupled at the upper and lower ends at the frame and at the boom arms respectively. Suitable hydraulic couplings (not shown) are provided for actuating the rams 19, 20 and 143.

A bracket 146 is attached to the lower strut 138 of the frame 136 for connection to a tie-rod 21 which extends from the lower edge of the inner frame of the boom arm forwardly therefrom to the chassis of the truck indicated at 127, to stabilize the lower end of the boom arm.

In operation with the boom arms arranged at the same height and adjusted by the rams 19 and 20 to the required height relative to the ground, the symmetry of the system retains the central support beam 15 vertical and the boom arms arranged at equal angles relative to the central support beam.

Should the frame 12 tilt, for example, to the left as shown in FIG. 2, gravity acts on the whole of the boom to apply force to the pin 16 to be moved to the left in an arc defined by the pivot coupling 17 and guided by the guide 151. As the pin 16 moves to the left, the left hand boom arm is pivoted about the pin 16 and about the coupling indicated at 191 at the bottom end of the ram 19 so that the end of the left hand boom is lifted relative to the ground. Simultaneously the right hand boom is pivoted about the pin 16 and the lower end 201 of the ram 20 to lower the right hand boom. Thus the booms tend to self-level so that the left hand boom which would otherwise be brought closer to the ground is raised and the right hand boom which would otherwise be raised, is lowered by the movement of the central beam and the central support pin 16. The springs 18 act as dampers to control the movement and to avoid wild fluctuations.

Should it be desired to raise or lower one of the boom arms while the other remains at a constant height in view of a change of height of the ground on one side of the frame, the respective ram 19, 20 can be actuated thus raising or lowering the required arm while the central support beam remains substantially vertical. Thus, while passing over a ditch or a ridge or a tree stump, the required boom can be lifted or raised as desired while the other boom arm remains in its previously set position over the level ground.

While in the raised or lowered condition, the central support beam 15 acts in the same manner as previously described to self-level the two boom arms with, of course, one remaining higher or lower than the other as set by the respective ram 19, 20.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A self-levelling boom arrangement for supporting upon a frame of an agricultural material distribution device comprising a pair of boom arms each arranged to extend outwardly to one side of the frame and including means for spreading said material along the length of the arms, a central support member, means mounting said central support member on said frame for free side to side movement relative thereto under forces applied thereto by the boom arms, means for spring biasing said central support member toward a central position thereof, pivotal mounting means mounting each of said arms on said central support member such that each arm can pivot independently relative thereto about a substantially horizontal axis at right angles to the length of the arm but is held against lateral movement relative thereto, and two linkage means each having one end thereof pivotally connected to a respective one of said arms at a position spaced from said pivotal mounting means and an opposed end thereof pivotally attached to said frame such that each arm is solely supported by said pivotal mounting means and a respective one of said linkage means, each said linkage means including means for increasing and reducing the effective length thereof so as to raise and lower the respective arm independently of the other arm whereby said boom arms can be independently raised and lowered by said linkage means and whereby common side to side movement of said central support member and arms provides a self-levelling effect to tend to accommodate tilting of the frame relative to the vertical.

2. The invention according to claim 1 wherein said spring biasing means comprises a pair of resilient springs interconnected on respective sides of said central support member to said frame.

3. The invention according to claim 2 wherein said linkage means is coupled to said respective arm outwardly of the central support member and is arranged to extend upwardly therefrom to support the arm against downward pivotal movement relative to said pivotal mounting means.

4. The invention according to claim 3 wherein said linkage means extends upwardly and inwardly from said arm.

5. The invention according to claim 1 wherein each linkage means comprises a hydraulic ram assembly arranged for actuation independently of the other linkage means for raising and lowering the respective arm.

6. The invention according to claim 1 wherein the central support member includes a pivot coupling for mounting thereof on said frame such that said pivotal mounting means moves side to side in an arc around said pivot coupling.

7. The invention according to claim 6 wherein said central support member is pivoted at a lower end thereof and includes guide means for guiding said side to side movement.

8. The invention according to claim 1 wherein the pivotal mounting means defines a single axis on said central support member about which both of said arms pivot.

9. The invention according to claim 1 wherein each said arm includes a plurality of spreading ducts stacked in a vertical plane and wherein said pivotal mounting means is arranged at the top of said arm, and wherein there is provided a tie-rod at the bottom of the arm for connecting said arm to said frame.

10. The invention according to claim 9 wherein the tie-rod extends substantially horizontally at right angles to said arm.

11. The invention according to claim 1 wherein each arm includes fold means whereby an outer portion of the arm can be folded in a horizontal plane to lie substantially at right angles to an inner portion of the arm so as to lie alongside a side portion of the frame, and wherein there is provided hydraulic ram means for actuating said folding means.

* * * * *